Jan. 4, 1944.  J. KOSLOW  2,338,519
STEP-VOLTAGE REGULATOR
Filed Oct. 22, 1942
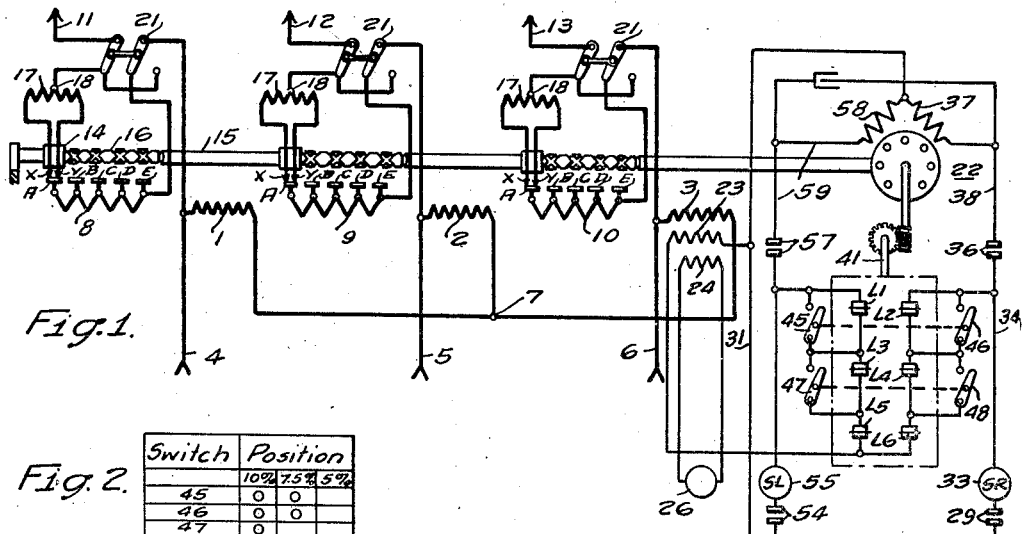
Fig.1.
Fig.2.
| Switch | Position | | |
|---|---|---|---|
| | 10% | 7.5% | 5% |
| 45 | O | O | |
| 46 | O | O | |
| 47 | O | | |
| 48 | | O | |
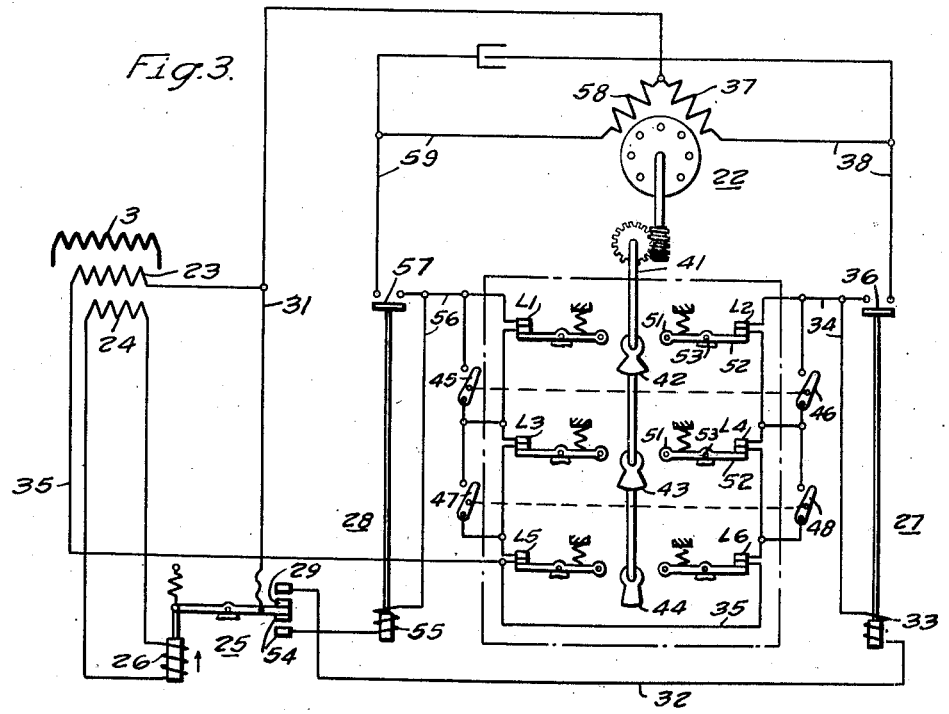
Fig.3.
WITNESSES:
INVENTOR
John Koslow.
BY
Franklin E. Hardy
ATTORNEY Patented Jan. 4, 1944

2,338,519

UNITED STATES PATENT OFFICE 2,338,519

STEP-VOLTAGE REGULATOR

John Koslow, Sharon, Pa., assignor to Westinghouse Electric & Manufacturing Company, East Pittsburgh, Pa., a corporation of Pennsylvania Application October 22, 1942, Serial No. 462,971

7 Claims. (Cl. 171—119)

This invention relates to voltage regulators and control circuits therefor, and more particularly to the provision of such regulators having a plurality of operating ranges, any one of which may be readily selected as the desired operating range for a given condition of the regulated circuit.

In regulating apparatus of the type in which two inductively related windings are employed, one connected across the supply circuit and the other connected to add or subtract a controlled voltage to or from the load circuit supplied from the regulator, the maximum safe current value of the primary winding may be the limiting factor in the capacity of the regulator. Such apparatus, when regulating the voltage of a load circuit carrying a relatively heavy current, can operate over a limited range only in the voltage added to or subtracted from the circuit for the same kilovolt ampere capacity of the regulator as it may safely operate when the load current being supplied is of a lesser value. It is desirable therefore to provide different means for limiting the range of operation of the regulator thus permitting a larger percentage voltage regulation in circuits where relatively light currents are employed than in circuits where relatively heavy currents are employed.

It is an object of the invention to provide a regulator of the above indicated character having a plurality of limit switch means for limiting the range of operation of the regulator, and manually operable means for selecting any desired set of limit switches for governing the operation of the regulator for limiting the load on the regulator to any desired value.

Other objects and advantages of the invention will be apparent from the following description of an embodiment thereof, reference being had to the accompanying drawing, in which:

Figures 1 and 3 are diagrammatic views of circuits and apparatus illustrating an embodiment of the invention, and Fig. 2 is a chart showing the arrangement of the selecting switches for different ranges of operation.

Referring to Fig. 1 of the drawing, a regulating system is illustrated comprising a three-phase regulator having primary windings 1, 2 and 3, connected between supply circuit conductors 4, 5 and 6, respectively, and a neutral conductor 7. Secondary windings 8, 9 and 10 are illustrated, inductively related to the primary windings 1, 2 and 3, respectively, through which current is supplied to the load circuit conductors 11, 12 and 13. The regulating apparatus for changing the tap connections of the secondary windings may correspond to that illustrated and described in Patent No. 2,036,305 to F. L. Snyder, issued April 7, 1936, and assigned to the some assignee as this application, and includes the conducting segments A, B, C, D and E connected to spaced points along the secondary winding of each regulator, which segments are engaged by movable contact members X and Y carried by a movable carriage 14 operated by a shaft 15 provided with a double set of grooves 16 which reverses the direction of movement of the traveling member 14 at one end of the shaft while the shaft is operated in the same direction of rotation. The contact members X and Y are connected to the opposite ends of a preventive auto-transformer 17 to the middle point 18 of which a conductor is connected for connecting the tapped point through a reversing switch 21, either to the load circuit conductors 11, 12 or 13, or to the supply circuit conductors 4, 5 or 6, depending upon the position of the switch 21. In one position of the switch 21 the voltages induced in the secondary winding 8, 9 or 10 adds to the voltage across the primary winding 1, 2 or 3 in the load circuit, and in the other position of the switch 21 the secondary voltage opposes or subtracts the voltage of the secondary winding in the load circuit from that of the supply circuit.

The shaft 15 is operated by a split-phase motor 22 supplied from a winding 23 as controlled by the voltage impressed upon a winding 24, the windings 23 and 24 being inductively related to the winding 33.

Referring to Figs. 1 and 3, a primary relay 25 is provided, having a winding 26 connected to the transformer winding 24 for controlling secondary relays 27 and 28 for governing operation of the motor 22 in one or the other direction. When the voltage in the regulated circuit falls below its desired value, the primary relay 25 will operate to close contact members 29 to close a circuit from the transformer winding 23 through conductor 31, the relay contact members 29, conductor 32, the winding 33 of relay 27, conductor 34 through the contact members of the normally closed limit switches L2, L4, L6 to conductor 35, which connects to the opposite end of the transformer winding 23, thus causing the relay 27 to close its contact members 36 which closes a circuit from winding 23 through conductor 31, motor winding 37, conductor 38, switch contact member 36, the contact members of limit switches L2, L4 and L6, conductor 35 to the source of energization 23.

This operation of the motor 22 will continue until interrupted by the primary relay 25 when the desired voltage correction of the circuit has been made unless operation earlier by one of the limit switches L2, L4 or L6. During operation of the motor 22 the shaft 41 is operated, moving the various cams 42, 43 and 44 which are so shaped that they will operate the limit switches L2, L4, L6 in sequence upon continued operation of the shaft 41 in a given direction.

Manually operable switches 45, 46, 47 and 48 are provided for selecting the desired range of operation of the regulator. If these switches are in their illustrated open circuit positions, the limit switch L2 will interrupt the circuit through the winding 33 of the secondary relay 27 upon engagement of the cam 42 with the roller 51 operating the switch lever arm 52 about its pivot point 53. The cam 42 may be of such a shape that this will permit a range of 5% voltage control. If a greater range of voltage control is desired, the switches 45 and 46 will be manually closed, thus completing a circuit in shunt relation to the limit switch L2 so that separation of its contact members will not interrupt the operation of the motor 22. Upon a further travel of the shaft 42, the cam 43 will engage the roller 51 of the limit switch L4 thus causing its contact members to separate and interrupt the operation of the motor 22. The cam 43 may be so adjusted that this limit switch permits a range of operation, of say, 7.5% voltage control. If it is desired to have the maximum voltage control, say 10%, all switches 45, 46, 47 and 48 are closed, thus shunting the contact members of limit switches L2 and L4 from the circuit through the winding 33 of the secondary relay 27 so that the limit switch L6, when engaged by the cam 44, will interrupt the circuit. No switches are provided for closing circuits in shunt to the final limit switches L5 and L6, since these limit switches are required to interrupt the operation of the regulator before it has been operated to a point where the mechanism will jam, that is, the limit switches L5 and L6 permit a maximum range of operation of the regulated equipment through its full series of tap changing operations.

If the voltage of the regulated circuit rises above the desired voltage, the relay contact members 54 will be closed, thus completing a circuit from winding 23 through conductor 31, contact members 54, winding 55 of a secondary relay 26, conductor 56, through the normally closed limit switches L1, L3 and L5 and conductor 35 to the other side of the winding 23 to operate the secondary relay 26 to its circuit closing position to close contact members 57. A circuit is now completed from winding 23, through conductor 31, the motor winding 58, conductor 59, switch contact members 57, limit switches L1, L3 and L5 and conductor 35 to the winding 23, thus causing the operation of the motor 22 in a direction to lower the voltage supplied to the load circuit conductors 11, 12 and 13. This operation of the motor 22 will continue until the desired correction has been made and the relay 25 returned to its mid or open-circuit position, unless the operation is interrupted by one of the limit switches L1, L3 or L5 which limit the lower range of operation of the regulator in a manner similar to the described operation of the limit switches L2, L4 and L6 which limit the upper range of operation of the regulator when the motor is operating in the opposite direction.

In Fig. 2, on the chart, the circles under each column indicate a closed switch. When all four switches 45, 46, 47 and 48 are open, the regulator will operate to provide a plus or minus 5% voltage change between the supply circuit and load circuit conductors. When the switches 45 and 46 only are closed, so that cam 43 controls the operating range of the regulator, a plus or minus 7.5% of voltage correction is provided, while, when all four switches, 45, 46, 47 and 48, are closed the cam 44 controls the range of operation of the regulator providing a 10% correction in voltage between the supply circuit conductors and the load circuit conductors. The particular percentage correction indicated in Fig. 2, is, of course, purely arbitrary, and any other percentages may be provided according to the ranges of operation of the regulator desired. Likewise the number of steps controlled by the limit switches may be varied by providing a lesser or greater number of sets of limit switches with a similar sequence of operation to that disclosed.

For example, if the regulator is designed to provide a full ten per cent regulation on a load circuit carrying 100 amperes, it may be adapted to regulate a circuit carrying, say, 133 amperes with the same kilovolt ampere capacity of the regulator by reducing the regulator range to 7.5% voltage correction, or it may be adapted to regulate a load circuit carrying 200 amperes by limiting the range of the regulator to 5% voltage correction. This decrease in the range of voltage correction as the load circuit current increases prevents overloading the regulator beyond the current carrying capacity of the primary windings 1, 2 and 3.

Modifications in the circuit and apparatus illustrated and described will occur to those skilled in the art, and I do not wish to be limited otherwise than by the scope of the appended claims.

I claim as my invention:

1. In combination, a supply circuit, a load circuit, a voltage varying regulator for adjusting the voltage of said load circuit independently of the voltage of said supply circuit and including a winding having a maximum safe current value, means for controlling the operation of said voltage varying regulator comprising a primary relay responsive to the voltage of said load circuit and motor operated mechanism controlled thereby, a plurality of pairs of range limiting switches for interrupting the operation of the motor at either end of an operative range of the regulator, the several pairs of switches being effective for establishing different operative ranges, and manually operable means for selecting any desired pair of range limiting switches for limiting the maximum current in said winding.

2. In combination, a supply circuit, a load circuit, a voltage varying regulator for adjusting the voltage of said load circuit independently of the voltage of said supply circuit and including a winding having a maximum safe current value, means for controlling the operation of said voltage varying regulator comprising a primary relay responsive to the voltage of said load circuit and motor operated mechanism controlled thereby, a plurality of range limiting switches connected in series for controlling the upper limit of operation of the regulator, a plurality of range limiting switches connected in series for controlling the lower limit of operation of the regulator, means actuated in accordance with the operation of the motor operated mechanism for operating said range limiting switches in sequence upon movement of the motor operated mechanism to the end of its operative range, and means for closing a shunt circuit about any range limiting switch in the sequence except the last for selecting a desired operative range of the regulator for limiting the maximum current in said winding.

3. In a voltage regulator, in combination, two inductively related windings, means for varying the operative relation of said windings to regulate the voltage of a circuit over a predetermined range, a motor for operating said means and means responsive to the voltage of the regulated circuit for governing the operation of the motor, a plurality of pairs of range limiting switches for interrupting the operation of the motor at either end of an operative range of the regulator, the several pairs of switches being effective for establishing different operative ranges, and manually operable means for selecting any desired pair of range limiting switches.

4. In combination, a supply circuit, a load circuit, a voltage varying regulator for adjusting the voltage of said load circuit comprising a primary winding connected across the supply circuit, a secondary winding inductively related to the primary winding and provided with connections to vary the voltage of the load circuit, and tap-changing mechanism for varying the tap-connections of the secondary winding, means for controlling the operation of said voltage varying regulator comprising a primary relay responsive to the voltage of said load circuit for controlling the operation of the tap-changing mechanism a plurality of separately operable range limiting means for limiting the range of operation of said voltage varying regulator, and means for manually selecting any desired one of said separately operable range limiting means for governing the operation of the regulator for limiting the current input to the regulator.

5. In combination, a supply circuit, a load circuit, a voltage varying regulator for adjusting the voltage of said load circuit independently of the voltage of said supply circuit and including a primary winding connected across the supply circuit and having a maximum safe current value, a secondary winding inductively related to the primary winding and provided with connections to vary the voltage of the load circuit, and tap-changing mechanism for varying the tap-connections of the secondary winding, means for controlling the operation of said voltage varying regulator comprising a primary relay responsive to the voltage of said load circuit for controlling the operation of the tap-changing mechanism and motor operated mechanism controlled thereby, a plurality of pairs of range limiting switches for interrupting the operation of the motor at either end of an operative range of the regulator, the several pairs of switches being effective for establishing different operative ranges, and manually operable means for selecting any desired pair of range limiting switches for limiting the maximum current in said winding.

6. In combination, a supply circuit, a load circuit, a voltage varying regulator for adjusting the voltage of said load circuit independently of the voltage of said supply circuit and including a winding having a maximum safe current value, a secondary winding inductively related to the primary winding and provided with connections to vary the voltage of the load circuit, and tap-changing mechanism for varying the tap-connections of the secondary winding, means for controlling the operation of said voltage varying regulator comprising a primary relay responsive to the voltage of said load circuit for controlling the operation of the tap-changing mechanism and motor operated mechanism controlled thereby, a plurality of range limiting switches connected in series for controlling the upper limit of operation of the regulator, a plurality of range limiting switches connected in series for controlling the lower limit of operation of the regulator, means actuated in accordance with the operation of the motor operated mechanism for operating said range limiting switches in sequence upon movement of the motor operated mechanism to the end of its operative range, and means for closing a shunt circuit about any range limiting switch in the sequence except the last for selecting a desired operative range of the regulator for limiting the maximum current in said winding.

7. In a voltage regulator, in combination, two inductively related windings, one winding having a maximum safe current value and the other provided with a plurality of tap connections to vary the voltage of the load circuit, and tap-changing mechanism for varying the tap-connections to regulate the voltage of a circuit over a predetermined range, a motor for operating said means and means responsive to the voltage of the regulated circuit for governing the operation of the motor, a plurality of pairs of range limiting switches for interrupting the operation of the motor at either end of an operative range of the regulator, the several pairs of switches being effective for establishing different operative ranges, and manually operable means for selecting any desired pair of range limiting switches.

JOHN KOSLOW.